US008272528B2

(12) United States Patent
Dunn (10) Patent No.: US 8,272,528 B2
(45) Date of Patent: Sep. 25, 2012

(54) MULTI-NUT RETENTION MECHANISM

(75) Inventor: John P. Dunn, Knoxville, TN (US)

(73) Assignee: U.S. Utility Enclosures, LLC, Sweetwater, TN (US)

( * ) Notice: Subject to any disclaimer, the term of this patent is extended or adjusted under 35 U.S.C. 154(b) by 574 days.

(21) Appl. No.: 12/533,078

(22) Filed: Jul. 31, 2009
(Under 37 CFR 1.47)

(65) Prior Publication Data
US 2011/0024428 A1  Feb. 3, 2011

(51) Int. Cl.
*B65D 45/10* (2006.01)
*H02G 3/14* (2006.01)
*F16B 39/02* (2006.01)

(52) U.S. Cl. ............ 220/328; 220/3.3; 220/3.8; 411/91; 411/166; 411/191

(58) Field of Classification Search .............. 220/328, 220/3.3, 3.4, 3.8; 411/166, 197, 191, 204, 411/214, 91, 92, 93, 98
See application file for complete search history.

(56) References Cited

U.S. PATENT DOCUMENTS

| | | | |
|---|---|---|---|
| 1,019,680 A * | 3/1912 | McGavock | 411/91 |
| 1,131,053 A * | 3/1915 | Garland | 411/91 |
| 1,136,234 A * | 4/1915 | Johnson et al. | 411/91 |
| 1,177,540 A * | 3/1916 | Sager | 411/91 |
| 1,528,019 A * | 3/1925 | Hebel | 411/91 |
| 1,741,077 A * | 12/1929 | Rusack | 411/91 |
| 3,760,234 A | 9/1973 | Jones et al. | |
| 3,972,440 A | 8/1976 | Warren | |
| 5,603,594 A * | 2/1997 | Lincoln | 411/84 |
| 5,627,340 A * | 5/1997 | Smith et al. | 174/482 |
| 5,795,117 A * | 8/1998 | Onoda | 411/92 |
| 5,823,577 A | 10/1998 | Johnston | |
| 5,919,018 A * | 7/1999 | Chuang | 411/149 |
| 6,164,131 A | 12/2000 | Edwards et al. | |
| 7,030,315 B1 | 4/2006 | Dunn et al. | |
| RE39,093 E | 5/2006 | Savoca | |
| 7,607,553 B2 * | 10/2009 | Weber | 220/328 |

* cited by examiner

*Primary Examiner* — Anthony Stashick
*Assistant Examiner* — Niki Eloshway
(74) *Attorney, Agent, or Firm* — Luedeka Neely Group, P.C.

(57) ABSTRACT

A utility box having a housing, and a ring that forms a hole that receives an attachment from a cover. A fastener retention piece has a first recess in a first surface, a second recess within the first recess, and a third recess in a second surface. The first and second recesses retain fasteners when the first surface is adjacent a lower surface of the ring. The third retaining recess retains a fastener when the second surface is adjacent the lower surface of the ring. The fasteners secure the attachment depending from the cover, and the recesses prohibit complete rotation of the fasteners.

19 Claims, 6 Drawing Sheets

MULTI-NUT RETENTION MECHANISM

FIELD

This invention relates to the field of underground utility boxes. More particularly, this invention relates to fastener retention pieces for underground utility boxes.

BACKGROUND

Underground utility boxes are used to provide access to a variety of different underground systems, such as electric, gas, water, telephone, data, and so forth. For example, a utility box can provide access to a valve, meter, or utility junction that is disposed under the ground. These boxes are typically comprised of a housing that fits over the portion of the system to which access is desired. The housing fits down into the ground, and is designed to be substantially completely buried, with the top of the housing disposed at about ground level. The housing is constructed in such a manner that it is difficult to remove the housing, without removing the earth around the box.

Utility boxes of this type typically have a cover that protects the system that is exposed within the box from unauthorized access or consequential damage. The cover is usually fastened to the box with one or more bolts that pass through the cover and are retained by some type of connection to the housing. Because the utility box cannot be conveniently accessed from below, the connection needs to be retained in some manner in the housing, so that the bolt can thread to it.

To accomplish this, underground utility box manufacturers fabricate their boxes with nuts that are affixed in some manner to the housing against which the cover is fastened. The nuts can be glued to the housing with an adhesive, or can be molded directly into the material of which the housing is formed. In this manner, the cover can be placed on the housing, and the bolt can be inserted through the holes in the cover and threaded into the nut that is affixed to the housing.

Unfortunately, the nuts tend to work loose from the housing over time. This can happen just through normal use over an extended period of time, or it can happen immediately if the bolt is tightened onto the nut with too great a force. Another problem with this configuration is when the nut becomes damaged in some manner. For example, if the bolt is not inserted correctly into the nut, the nut can be cross threaded. When problems such as any of these occur, there is no easy way to replace the nut in the housing, and in many cases the housing has to be damaged in order to remove and replace the nut.

In an effort to provide a field replaceable nut, some manufacturers have introduced additional flaws to their products. In some cases, the nut is inserted into the ring with no means of drainage beneath the nut. Since the product is typically used outside and exposed to the elements, water inevitably enters the fastener and settles in the area of the nut. Two problems can result from this scenario. First, the fastener and nut are subjected to the corrosive effects of the trapped water, and second, when the product is exposed to freezing temperatures, the water expands and cracks the ring.

In other cases, nuts require replacement due to damage from weather or other causes. Typically, only specific sizes of nuts are available for securing the cover because of constraints in the design of the ring.

What is needed, therefore, is a system that overcomes problems such as those described above, at least in part.

SUMMARY

The above and other needs are met by a utility box having a housing and a ring affixed on an upper circumferential rim of the housing. The ring is adapted to receive a cover. The ring forms a through hole extending straight through from an upper surface of the ring to a lower surface of the ring. The through hole is adapted to receive an attachment means depending from the cover. A fastener retention piece forms a first retaining recess from a first surface of the fastener retention piece for retaining a first fastener when the fastener retention piece is in a first configuration. The first configuration includes the first surface disposed in substantial alignment with the through hole and adjacent the lower surface of the ring. In the first configuration, the first fastener is retained within the first retaining recess by the lower surface of the ring in some applications.

The first fastener mates with and secures the attachment means depending from the cover, and the first retaining recess is prohibits complete rotation of the first fastener around an axis that is substantially parallel to the through hole. In some embodiments of the present invention, the first retaining recess has a substantially quadrilateral horizontal cross section, a first side and a second side opposite the first side, the first side and the second side separated by a first distance and a third side and a fourth side opposite the third side separated by a second distance.

A second retaining recess is formed within the first retaining recess for retaining a second fastener when the first fastener is not retained within the first retaining recess and when the fastener retention piece is in the first configuration. In some applications, the second fastener is retained within the second retaining recess by the lower surface of the ring when the piece is in the first configuration. The second fastener mates with and secures the attachment means depending from the cover, and the second retaining recess prohibits complete rotation of the second fastener around an axis that is substantially parallel to the through hole. In some embodiments, the second retaining recess has a substantially quadrilateral horizontal cross section, a fifth side and a sixth side opposite the fifth side, the fifth side and the sixth side separated by a third distance and a seventh side and an eighth side opposite the seventh side separated by a fourth distance.

A third retaining recess is formed from a second surface of the fastener retention piece opposite the first surface for retaining a third fastener when the fastener retention piece is in a second configuration. The second configuration includes the second surface being disposed in substantial alignment with the through hole and adjacent the lower surface of the ring such that the third fastener is retained within the third retaining recess by the lower surface of the ring. The third fastener mates with and secures the attachment means depending from the cover, and the third retaining recess prohibits complete rotation of the third fastener around an axis that is substantially parallel to the through hole. In some embodiments, the third retaining recess has a substantially quadrilateral horizontal cross section, a ninth side and a tenth side opposite the ninth side, the ninth side and the tenth side separated by a fifth distance and an eleventh side and a twelfth side opposite the eleventh side separated by a sixth distance. In some embodiments, the third distance is less than the first distance, the fifth distance is less than the third distance, the fourth distance is less than the second distance, and the sixth distance is less than the fourth distance.

In various embodiments, at least one of the first, second, third, and fourth sides has a wing protruding from the side into the first retaining recess configured for prohibiting complete rotation of the first fastener around an axis that is substantially parallel to the through hole. In other embodiments, the wing has a horizontal cross section in the shape of a scalene triangle.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

A fastener retention piece for a utility box allows a user flexibility in choosing fasteners retained by the piece. Specifically, the fastener retention piece provides the opportunity to use fasteners having varying dimensions.

Figure 1:
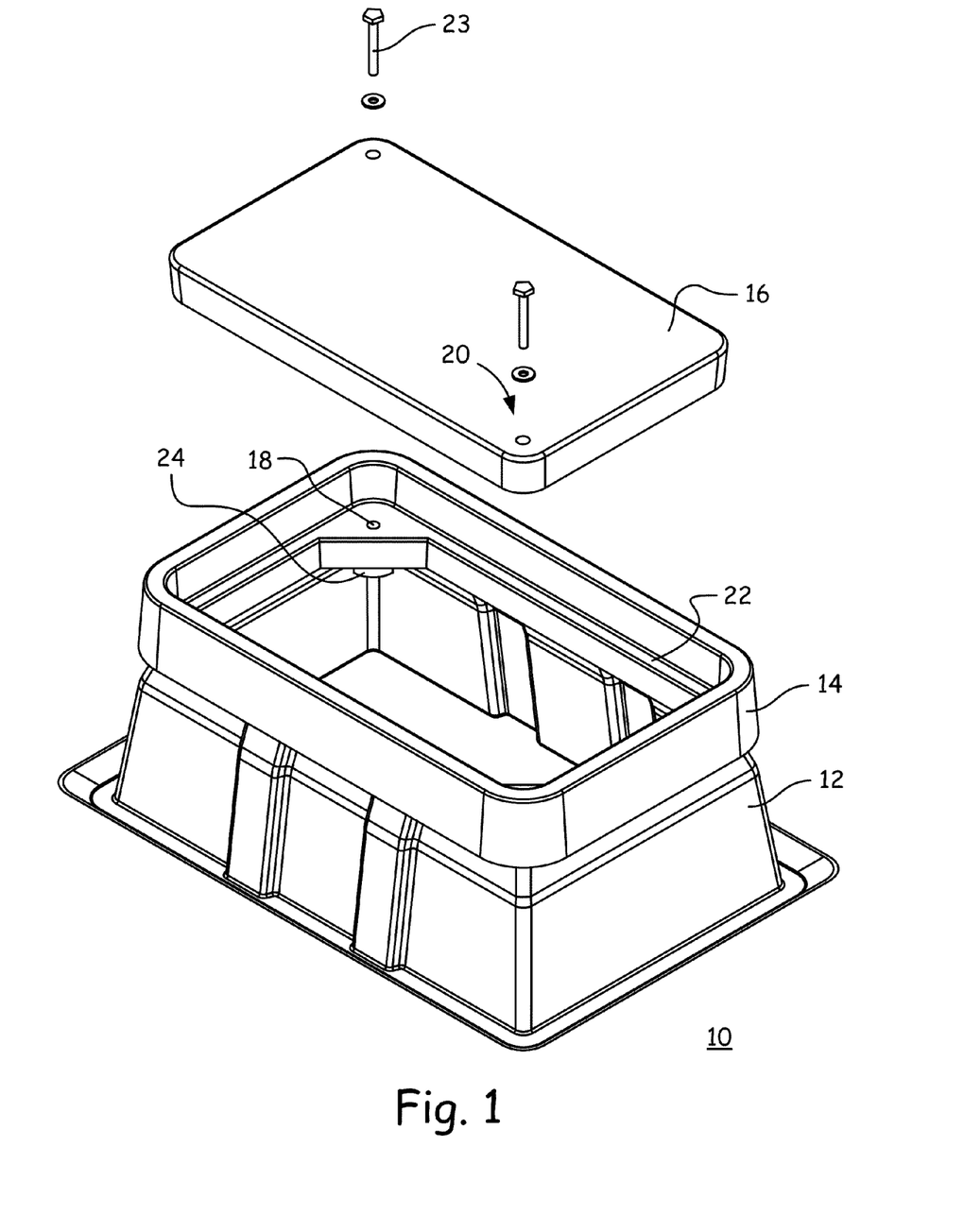
FIG. 1 is a perspective view of an underground utility box according to an embodiment of the present invention.
Figure 2:
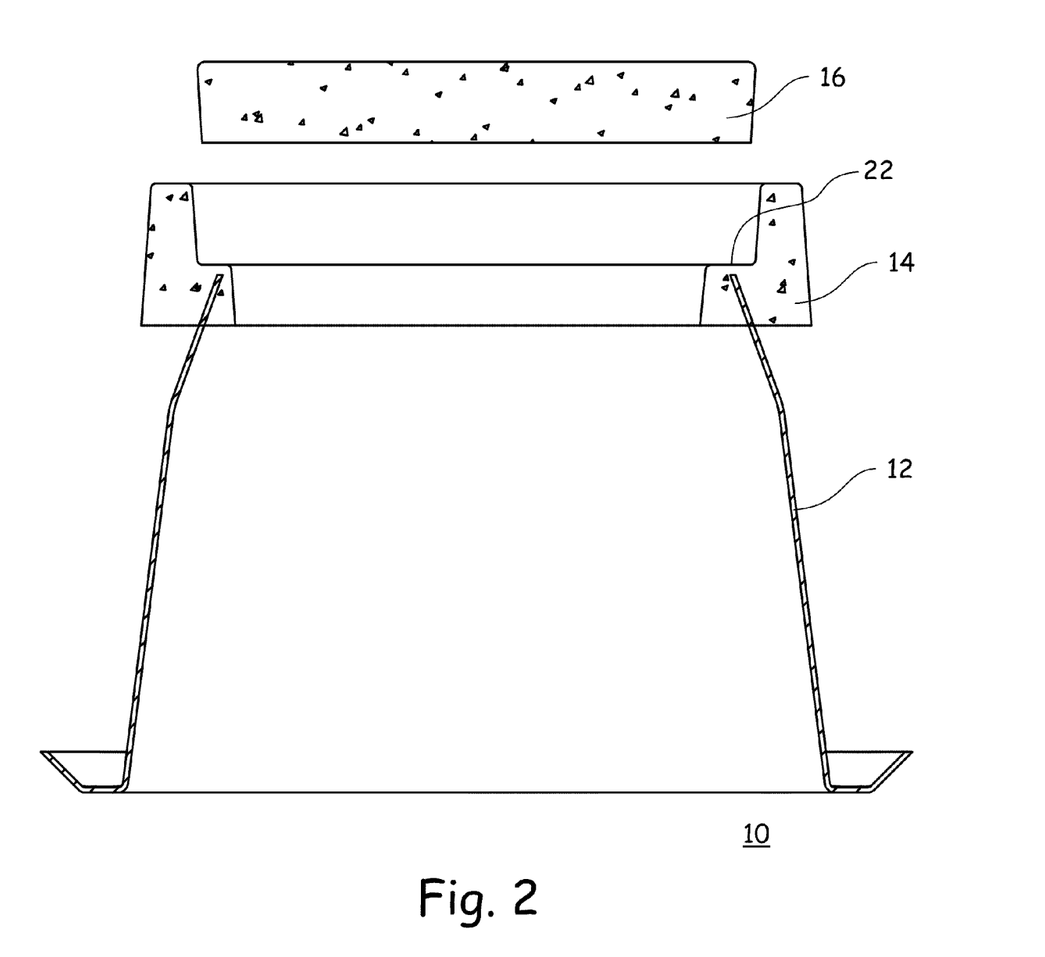
FIG. 2 is a cross sectional view of an underground utility box according to an embodiment of the present invention.

With reference now to FIGS. 1 and 2, there is provided a perspective depiction and a cross sectional depiction respectively of an underground utility box 10 according to a preferred embodiment of the present invention. The utility box 10 is designed to be buried in the ground with an upper surface of the box 10 disposed substantially at ground level. The box 10 includes a housing 12 that encompasses the system to be housed within the box 10. The housing 12 is typically formed of a material that provides a desired degree of structural support and which will not readily decay or become otherwise damaged in an underground environment. The environment may be wet or dry dirt, clay, asphalt, gravel, sand, or some other type of filling material or mixture of such. Fiberglass tends to work well for the construction of the housing 12.

The sides of the housing 12 may be ribbed to provide additional structural support, or may have other elements that provide structural support. The bottom of the housing 12 is open in this embodiment, so as to enable the box 10 to be placed over the system to be protected within the box 10. The sidewalls of the housing 12 may slope from a smaller circumferential perimeter at the top of the box 10 to a larger circumferential perimeter at the bottom the box 10. This slope tends to reduce the size of the upper opening in the box 10, increase the difficulty of removing the box 10 after it has been buried, and increase the structural strength of the box 10, all of which are desired attributes of the box 10. In this embodiment, the lower circumferential edge of the housing 12 has an upward curving lip to further increase the difficulty of removing the box 10 after it has been buried.

A ring 14 is disposed around an upper circumferential edge of the housing 12. Within the ring 14 are one or more, and in typical embodiments two, through holes 18 adapted to receive attachment means 23, as described in more detail below. In most embodiments, the ring 14 is formed of a polymer concrete that is cast onto the housing 12. In other embodiments the ring 14 is formed of the same material as the housing 12, and is molded onto the housing 12. In yet another embodiment the ring 14 is formed of the same material as the housing 12, and is formed in the same molding process by which the housing 12 is fabricated.

The ring 14 has a lip 22 that is adapted to receive the cover 16. The lip 22 is sized so that the cover 16 aligns with the ring 14 in a manner as described in more detail below. In most embodiments, the lip 22 is also sized so as to allow relatively unrestrained access to the inside of the box 10 through the ring 14, while still having the ability to support the cover 16 in a manner that it does not fall too easily through the ring 14 and into the box 10 when the cover 16 is being placed on the ring 14. The cover 16 is typically formed of the same material as the ring 14, but may alternately be formed of any material that is compatible with the materials, environments, and applications generally described herein.

The cover 16 includes a bore 20, and in most embodiments includes at least two such bores 20, which are adapted to receive attachment means 23. The attachment means 23 are bolts in most embodiments, and, in other embodiments, are other types of pins designed to engage with a fastener, such as a fastener retention piece 24, as described in more detail below. As introduced above, the ring 14 is sized so that when the cover 16 is disposed on the lip 22, the bores 20 are substantially aligned with the through holes 18. In one embodiment, the top surface of the cover 16 is substantially coplanar with the top surface of the ring 14 when the cover 16 is in place on the lip 22 of the ring 14.

Figure 3:
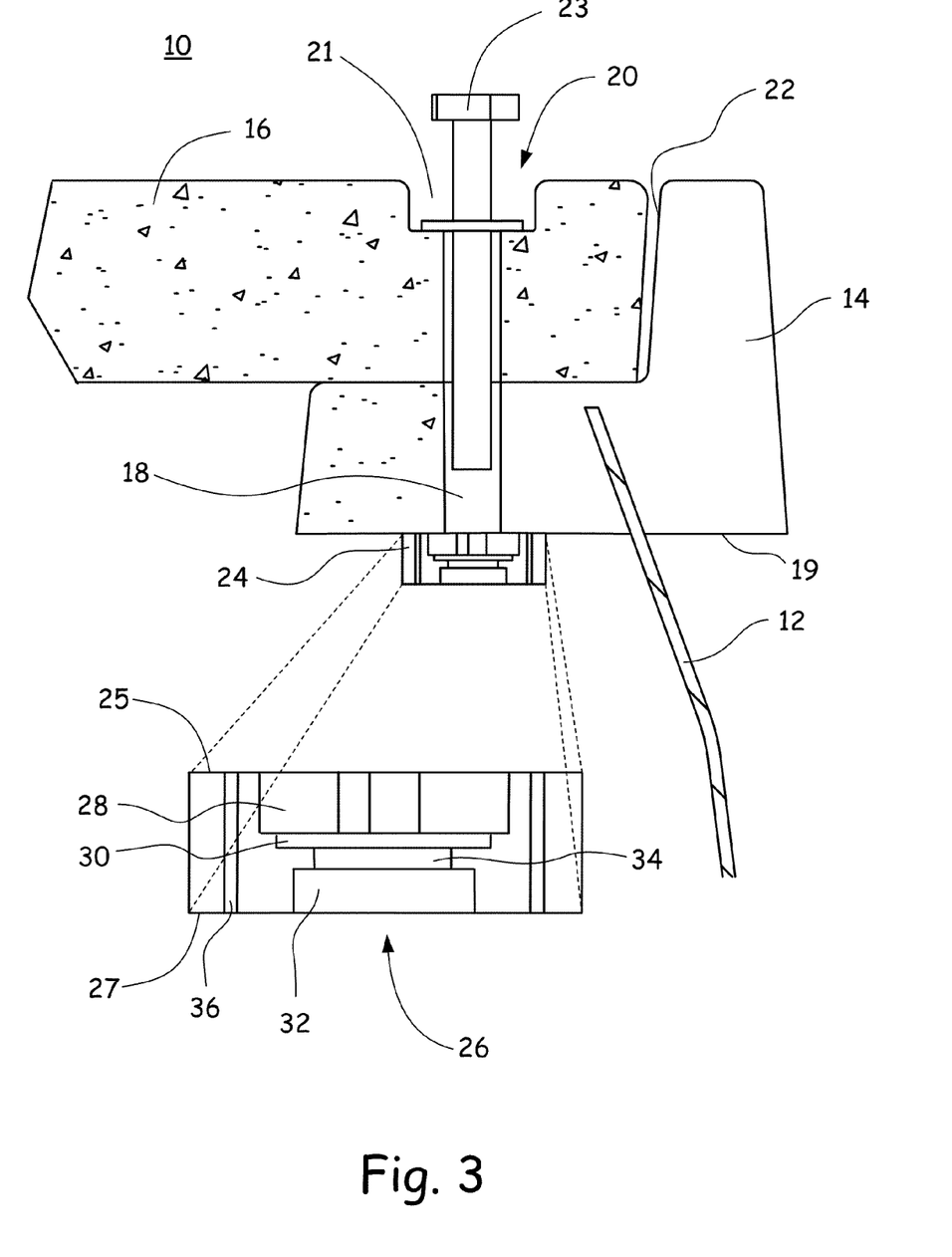
FIG. 3 is a detailed cross sectional and blown-up view of a fastener retention piece for an underground utility box according to an embodiment of the present invention.

With reference now to FIG. 3 there is depicted an enlarged cross sectional view of a portion of the box 10, which provides more detail in regard to the fastener retention piece 24, which is blown up for ease of illustration. FIG. 3 depicts a portion of the cover 16 residing in the lip 22 of the ring 14, and a portion of the housing 12. As depicted in FIG. 3, an attachment means 23, such as a bolt, fits down through the through hole 20 in the cover 16, and extends below the bottom surface of the cover 16. The attachment means 23 is retained against the top surface of the cover 16, such as by a head on the end of the attachment means 23 that fits within a recess 21 of the bore 20 in the cover 16. A washer is optionally used in the recess 21, as desired. In most embodiments, the attachment means 23 does not extend above the top surface of the cover 16 when in use.

The attachment means 23 is received by the through hole 18 in the ring 14. The through hole 18, in one embodiment, extends completely through the ring 14 from an upper surface of the ring 14 to a lower surface 19 of the ring 14. The attachment means is also received by a through hole 26 in the fastener retention piece 24, which is arranged in a first configuration whereby a first surface 25 of the fastener retention piece 24 is disposed adjacent the lower surface 19 of the ring 14 and through hole 18 and through hole 26 are arranged such that they are in substantial alignment with one another. The through hole 26 of the fastener retention piece 24 extends completely through the fastener retention piece 24 from the upper surface 25 of the piece 24 to a lower surface 27 of the piece 24.

The through hole 26, in one embodiment, has four different sections. The first section, also referred to as a first retaining recess 28, is formed from the first surface 25 of the fastener retention piece 24, and is a bore adapted to retain a first fastener. The second section also referred to as a second retaining recess 30, is formed within the first retaining recess 28, and is a bore adapted to retain a second fastener when the first retaining recess 28 is not retaining the first fastener. The third section, also referred to as a third retaining recess 32, is formed from the second surface 27, opposite the first surface 25, of the fastener retention piece 24, and is a bore adapted to retain a third fastener when the fastener retention piece 24 is in a second configuration whereby the second surface 27 of the piece 24 is disposed adjacent the lower surface 19 of the ring 14 and through hole 18 is in substantial alignment with through hole 26. The fourth section 34 is disposed between the second and third retaining recesses 30 and 32 and receives the attachment means 23. Each of these sections is described in more detail below.

The fastener retention piece 24 has apertures 36, which are bores adapted to receive fasteners for securing the piece 24 adjacent the lower surface 19 of the ring 14. In most embodiments, the piece 24 is secured by fasteners such as bolts or screws that are removable so that the piece 24 can easily be configured in both the first and second configurations discussed above. In one embodiment, the apertures 36 extend completely through the piece 24 from the first surface 25 to the second surface 27, but in other embodiments, the apertures 36 extend partially from the first and second surfaces 25 and 27 of the piece 24 without extending completely through the piece 24.

Figure 4:
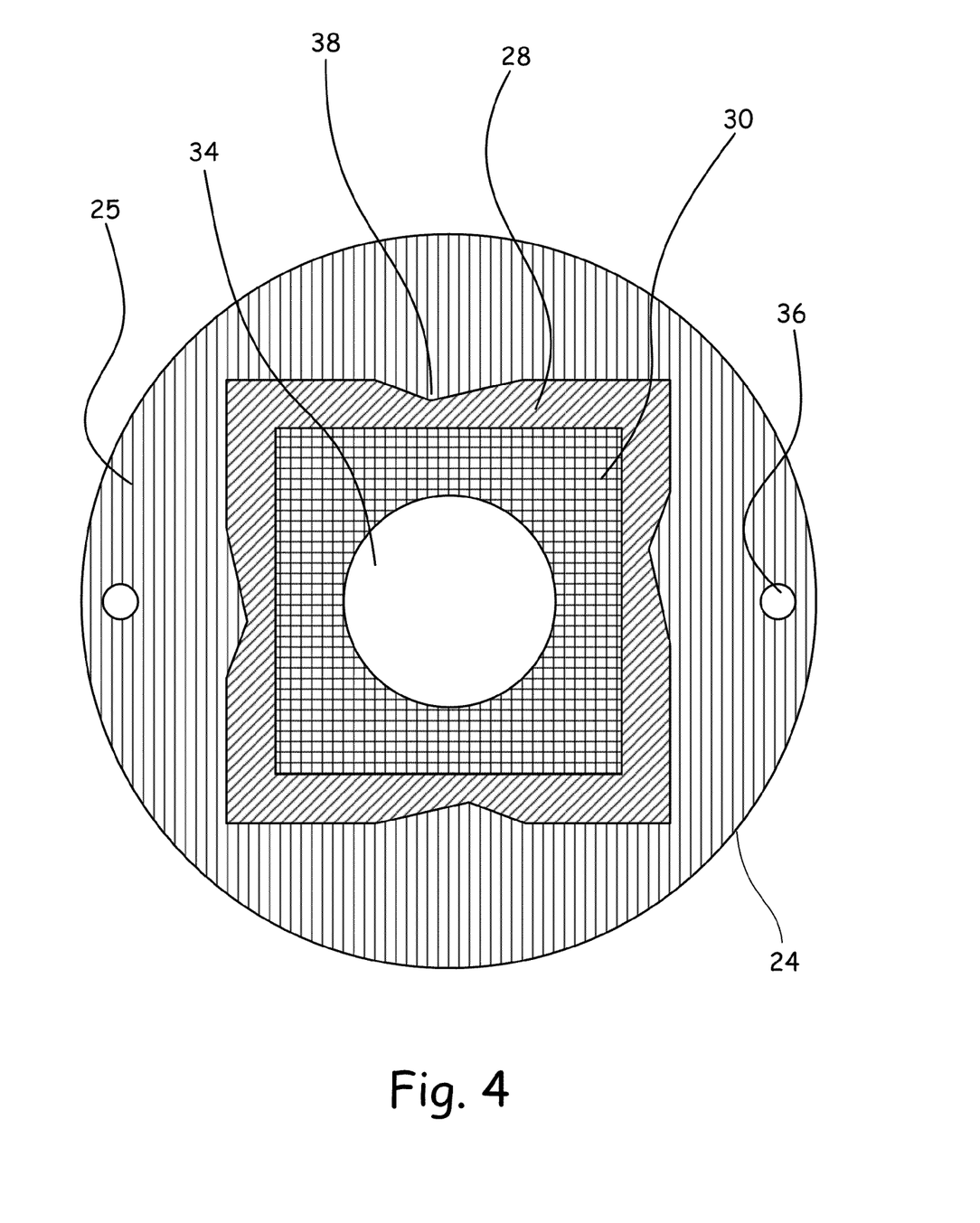
FIG. 4 is a top view of the fastener retention piece for an underground utility box according to an embodiment of the present invention.
Figure 5:
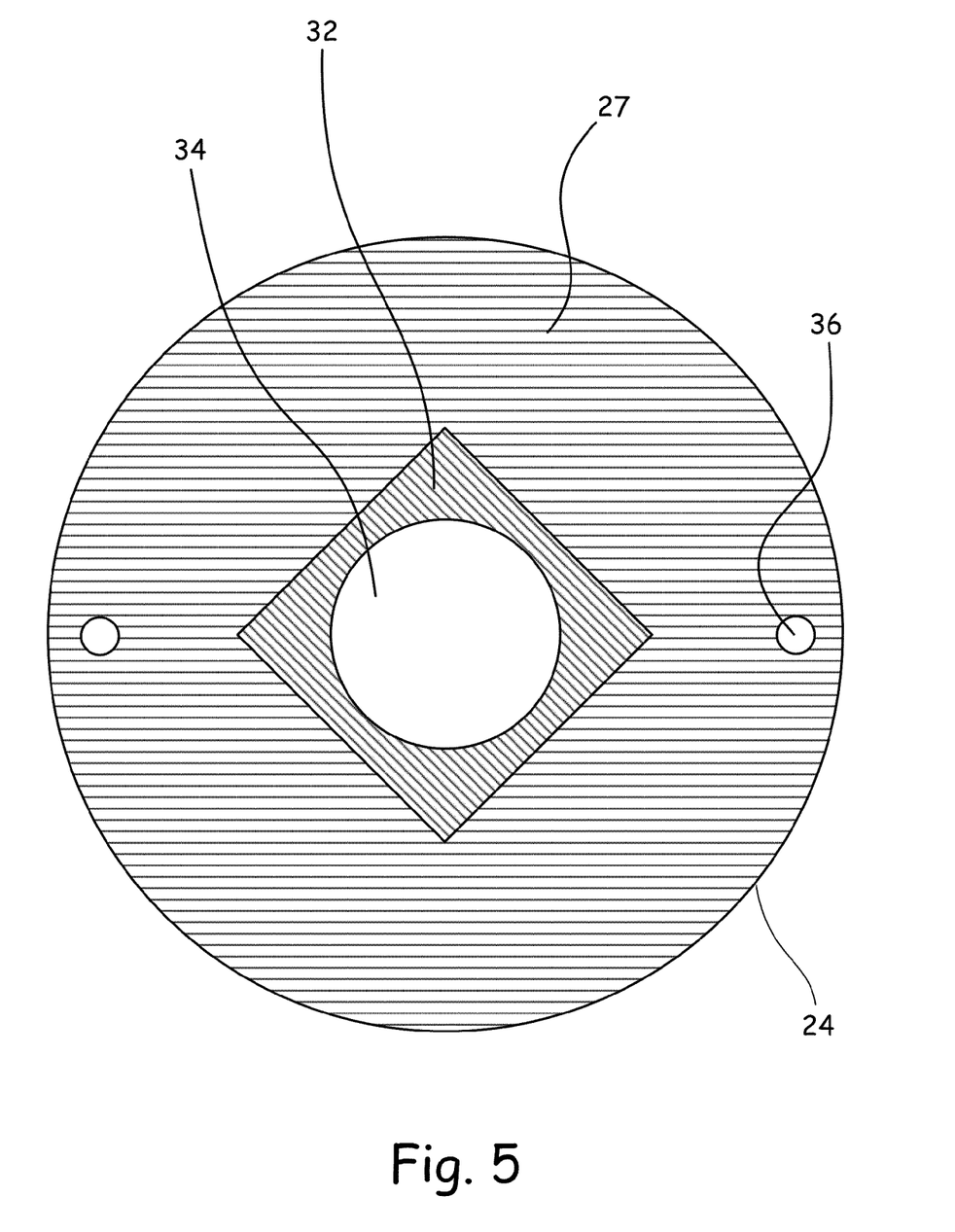
FIG. 5 is a bottom view of the fastener retention piece for an underground utility box according to an embodiment of the present invention.
Figure 6:
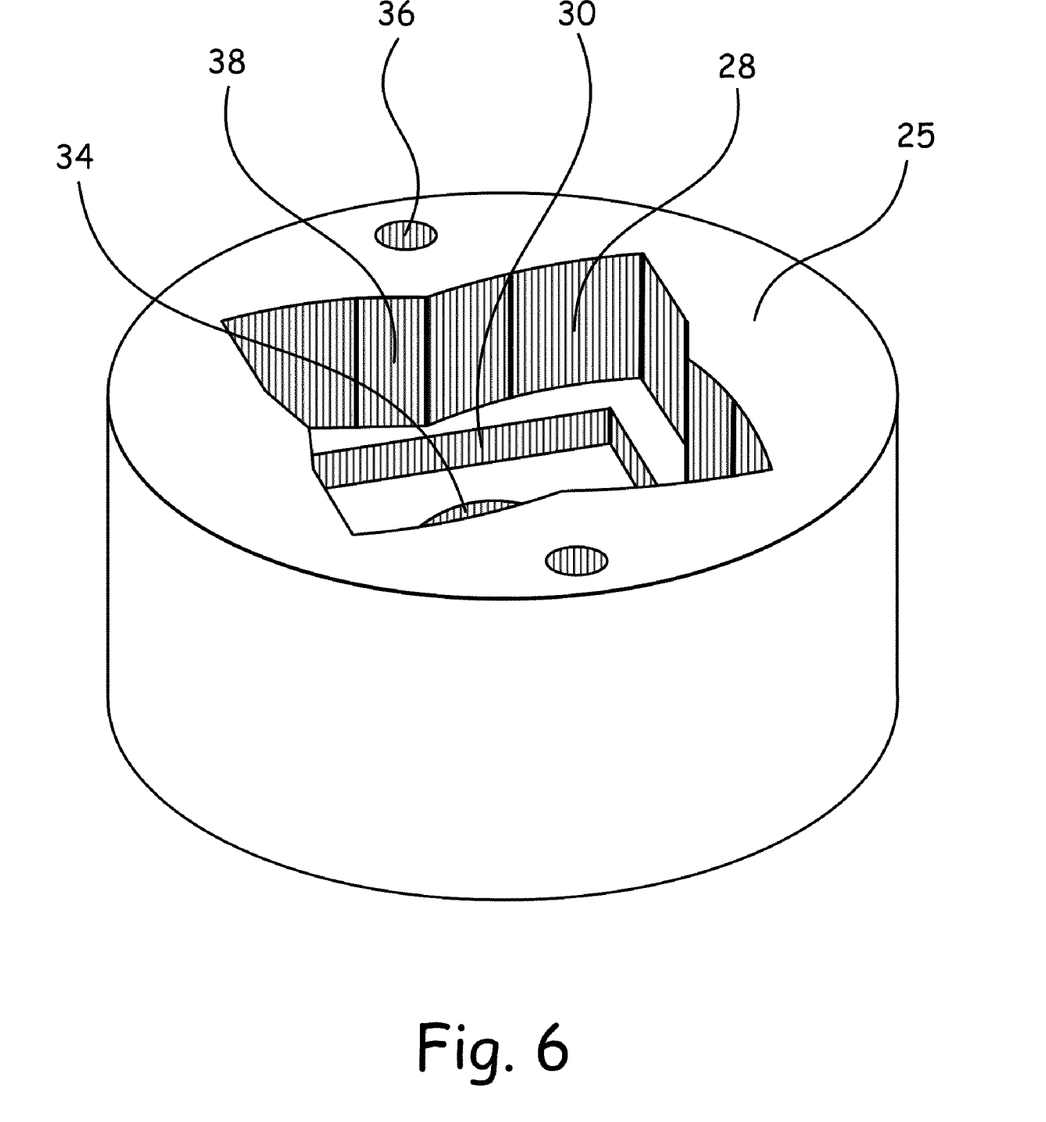
FIG. 6 is a perspective view of the fastener retention piece for an underground utility box according to an embodiment of the present invention.

Referring now to FIGS. 4, 5 and 6, the fastener retention piece 24 is shown from overhead. The first retaining recess 28, as described above, is formed from the first surface 25 of the piece 24. In one embodiment, the recess 28 has a square cross section with four sides, each of which has a wing 38 protruding from the side into the recess 28. The wings 38 are typically triangular prisms with sides having different cross-sectional lengths such that the vertices of the wings are offset from the center. That is, the vertices do not align with the diameter of the cross-section of the fastener retention piece 24.

In cooperation with the lower surface 19 of the ring 14, the first retaining recess 28 is adapted to retain a fastener such as a nut. The first retaining recess 28 and the wings 38 are configured to prohibit complete rotation of the fastener around an axis substantially parallel to through hole 18 of the ring 14 thereby permitting the fastener to mate with and secure the attachment means 23 depending from the cover 16.

The second retaining recess 30 is formed from the first retaining recess 28 and is also adapted, in cooperation with the lower surface 19 of the ring 14, to retain a second fastener such as a nut when the first fastener is not retained in the first retaining recess 28. Similar to the first retaining recess 28, the second retaining recess 30 prohibits complete rotation of the second fastener around an axis substantially parallel to through hole 18 of the ring 14 thereby permitting the second fastener to mate with and secure the attachment means 23 depending from the cover 16. Similar to the first retaining recess, the second retaining recess 30 has a square cross-section in some embodiments; however, the length of its sides is less than the length of the sides of the first retaining recess 28. The first and second retaining recesses 28 and 30 are usable when the piece 24 is secured in the first configuration discussed above, whereby the first surface 25 of the piece 24 is adjacent the lower surface 19 of the ring 14.

The third retaining recess 32 is formed from the second surface 27 of the fastener retaining piece 24 and, similar to the first and second retaining recesses 28 and 30, is adapted, in cooperation with the lower surface 19 of the ring 14, to retain a third fastener such as a nut. However, dissimilar to the first and second retaining recesses 28 and 30, the third retaining recess 32 is usable when the piece 24 is in the second configuration whereby the second surface 27 of the piece 24 is secured adjacent the lower surface 19 of the ring 14.

Thus, according to one embodiment of the present invention, a fastener retention piece for use in a utility box has three retaining recesses formed in two of its surfaces, each having different dimensions. Each of the recesses is configured to retain and prohibit substantial rotation of a fastener for mating with attachment means depending from a cover for the utility box. A user can adjust the fastener retention piece into a first configuration wherein the first and second retaining recesses are usable and into a second configuration wherein the third retaining recess is usable. Thus, the fastener retention piece allows the user several options in choosing a fastener to be retained by the piece and to mate with the attachment means thereby securing the cover on the utility box.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A utility box, comprising:

a housing, and a ring affixed on an upper circumferential rim of the housing, the ring adapted to receive a cover, the ring forming a through hole extending straight through from an upper surface of the ring to a lower surface of the ring, the through hole adapted to receive an attachment means depending from the cover, and a fastener retention piece forming:

a first retaining recess from a first surface of the fastener retention piece for retaining a first fastener when the fastener retention piece is in a first configuration whereby the first surface is disposed in substantial alignment with the through hole and adjacent the lower surface of the ring such that the first fastener is retained within the first retaining recess by the lower surface of the ring, the first fastener for mating with and securing the attachment means depending from the cover, the first retaining recess adapted to prohibit complete rotation of the first fastener around an axis that is substantially parallel to the through hole, the first retaining recess having a substantially quadrilateral horizontal cross section, a first side and a second side opposite the first side, the first side and the second side separated by a first distance and a third side and a fourth side opposite the third side separated by a second distance, a second retaining recess within the first retaining recess for retaining a second fastener when the first fastener is not retained within the first retaining recess and when the fastener retention piece is in the first configuration such that the second fastener is retained within the second retaining recess by the lower surface of the ring, the second fastener for mating with and securing the attachment means depending from the cover, the second retaining recess adapted to prohibit complete rotation of the second fastener around an axis that is substantially parallel to the through hole, the second retaining recess having a substantially quadrilateral horizontal cross section, a fifth side and a sixth side opposite the fifth side, the fifth side and the sixth side separated by a third distance and a seventh side and an eighth side opposite the seventh side separated by a fourth distance, a third retaining recess from a second surface of the fastener retention piece opposite the first surface for retaining a third fastener when the fastener retention piece is in a second configuration whereby the second surface is disposed in substantial alignment with the through hole and adjacent the lower surface of the ring such that the third fastener is retained within the third retaining recess by the lower surface of the ring, the third fastener for mating with and securing the attachment means depending from the cover, the third retaining recess adapted to prohibit complete rotation of the third fastener around an axis that is substantially parallel to the through hole, the third retaining recess having a substantially quadrilateral horizontal cross section, a ninth side and a tenth side opposite the ninth side, the ninth side and the tenth side separated by a fifth distance and an eleventh side and a twelfth side opposite the eleventh side separated by a sixth distance, and wherein:

the third distance is less than the first distance,
the fifth distance is less than the third distance,
the fourth distance is less than the second distance,
the sixth distance is less than the fourth distance.

2. The utility box of claim 1 wherein at least one of the first, second, third, and fourth sides has a wing protruding from the side into the first retaining recess and configured for prohibiting complete rotation of the first fastener around an axis that is substantially parallel to the through hole.

3. A fastener retention piece configured for use in a utility box having a housing and a ring affixed on an upper circumferential rim of the housing, the ring adapted to receive a cover, the ring having an attachment portion forming a through hole extending from an upper surface of the attachment portion to a lower surface of the attachment portion, the through hole adapted to receive an attachment means depending from the cover, the fastener retention piece comprising:

a first surface forming a first retaining recess for retaining a first fastener when the fastener retention piece is in a first configuration whereby the first surface is disposed in substantial alignment with the through hole and adjacent the lower surface of the ring such that the first fastener is retained within the first retaining recess by the lower surface of the ring, the first fastener for mating with and securing the attachment means depending from the cover, the first retaining recess having a substantially quadrilateral horizontal cross section and a first side and a second side opposite the first side, the first side and the second side separated by a first distance and a third side and a fourth side opposite the third side separated by a second distance, the first retaining recess adapted to prohibit complete rotation of the first fastener around an axis that is substantially parallel to the through hole.

4. The fastener retention piece of claim 3 wherein a second retaining recess is formed from a second surface of the fastener retention piece opposite the first surface for retaining a second fastener when the fastener retention piece is in a second configuration whereby the second surface is disposed in substantial alignment with the through hole and adjacent the lower surface of the ring such that the second fastener is retained within the second retaining recess by the lower surface of the ring, the second fastener for mating with and securing the attachment means depending from the cover, the second retaining recess adapted to prohibit complete rotation of the second fastener around an axis that is substantially parallel to the through hole.

5. The fastener retention piece of claim 3 wherein at least one of the first, second, third, and fourth sides has a wing protruding from the side into the first retaining recess and configured for prohibiting complete rotation of the first fastener around an axis that is substantially parallel to the through hole.

6. The fastener retention piece of claim 3 wherein a second retaining recess is formed within the first retaining recess for retaining a second fastener when the fastener retention piece is in the first configuration such that the second fastener is retained within the second retaining recess by the lower surface of the ring and when the first fastener is not retained within the first retaining recess, the second fastener for mating with and securing the attachment means depending from the cover.

7. The fastener retention piece of claim 3 wherein the first retaining recess has a substantially quadrilateral horizontal cross section having a first side and a second side opposite the first side, the first side and the second side separated by a first distance, and having a third side and a fourth side opposite the third side separated by a second distance, and wherein:

a second retaining recess is formed within the first retaining recess for retaining a second fastener when the fastener retention piece is in the first configuration such that the second fastener is retained within the second retaining recess by the lower surface of the ring and when the first fastener is not retained within the first retaining recess, the second fastener for mating with and securing the attachment means depending from the cover, the second retaining recess having a substantially quadrilateral horizontal cross section having a fifth side and a sixth side opposite the fifth side, the fifth side and the sixth side separated by a third distance that is less than the first distance, and having a seventh side and an eighth side opposite the seventh side, the seventh side and the eighth side separated by a fourth distance that is less than the second distance.

8. The fastener retention piece of claim 7 wherein a third retaining recess is formed from a second surface of the fastener retention piece opposite the first surface for retaining a third fastener when the fastener retention piece is in a second configuration whereby the second surface is disposed in substantial alignment with the through hole and adjacent the lower surface of the ring such that the third fastener is retained within the third retaining recess by the lower surface of the ring, the third fastener for mating with and securing the attachment means depending from the cover, the third retaining recess adapted to prohibit complete rotation of the third fastener around an axis that is substantially parallel to the through hole.

9. The fastener retention piece of claim 8 wherein the third retaining recess has a substantially quadrilateral horizontal cross section having a ninth side and a tenth side opposite the ninth side, the ninth side and the tenth side separated by a fifth distance less than the third distance, and having an eleventh side and a twelfth side opposite the eleventh side separated by a sixth distance less than the fourth distance.

10. The fastener retention piece of claim 9 wherein at least one of the first, second, third, and fourth sides has a wing protruding from the side into the first retaining recess and configured for prohibiting complete rotation of the first fastener around an axis that is substantially parallel to the through hole.

11. The fastener retention piece of claim 10 wherein the wing has a horizontal cross section in the shape of a scalene triangle.

12. A utility box, comprising:
a housing;
a ring affixed on an upper circumferential rim of the housing, the ring adapted to receive a cover, the ring having an attachment portion including a ring through hole extending from an upper surface of the attachment portion to a lower surface of the attachment portion, the through hole adapted to receive an attachment means depending from the cover,
a fastener retention piece having a fastener retention piece through hole operable to be substantially aligned with the ring through hole for connecting the cover to the housing, the fastener retention piece comprising:
a first retaining recess dimensioned and configured for retaining a first fastener and prohibiting rotation of the first fastener in the first retaining recess, the first fastener for mating with and securing the attachment means when the attachment means extends through the ring through hole and into the fastener retention piece and the first fastener is retained in the first retaining recess; and
a second retaining recess dimensioned and configured for retaining a second fastener having a size different than the first fastener and prohibiting rotation of the second fastener in the second retaining recess, the second fastener for mating with and securing the attachment means when the attachment means extends through the ring through hole and into the fastener retention piece through hole and the second fastener is retained in the second retaining recess.

13. The utility box of claim 12 wherein the first retaining recess has a substantially quadrilateral horizontal cross section and has a first side and a second side opposite the first side, the first side and the second side separated by a first distance and a third side and a fourth side opposite the third side separated by a second distance.

14. The utility box of claim 13 wherein at least one of the first, second, third, and fourth sides has a wing protruding from the side into the first retaining recess and configured for prohibiting complete rotation of the first fastener around an axis that is substantially parallel to the through hole.

15. The utility box of claim 12 wherein the first retaining recess has a substantially quadrilateral horizontal cross section having a first side and a second side opposite the first side, the first side and the second side separated by a first distance, and having a third side and a fourth side opposite the third side separated by a second distance, and wherein:
the second retaining recess is formed within the first retaining recess for retaining the second fastener when the first fastener is not retained within the first retaining recess, the second retaining recess having a substantially quadrilateral horizontal cross section having a fifth side and a sixth side opposite the fifth side, the fifth side and the sixth side separated by a third distance that is less than the first distance, and having a seventh side and an eighth side opposite the seventh side, the seventh side and the eighth side separated by a fourth distance that is less than the second distance.

16. The utility box of claim 15 wherein the fastener retention piece includes a first surface and a second surface and a third retaining recess for retaining a third fastener, the first retaining recess being formed from the first surface and the third retaining recess being formed from the second surface, the fastener retention piece operable to be positioned in one of a first configuration where the first surface is adjacent the lower surface of the attachment portion of the ring for securing the cover to the housing using one of the first fastener and the second fastener and a second configuration where the second surface is adjacent the lower surface for securing the cover to the housing using the third fastener.

17. The utility box of claim 16 wherein the third retaining recess has a substantially quadrilateral horizontal cross section having a ninth side and a tenth side opposite the ninth side, the ninth side and the tenth side separated by a fifth distance less than the third distance, and having an eleventh side and a twelfth side opposite the eleventh side separated by a sixth distance less than the fourth distance.

18. The utility box of claim 12, wherein the fastener retention piece includes a first surface and a second surface, the first retaining recess being formed from the first surface and the second retaining recess being formed from the second surface, the fastener retention piece being operable to be positioned in one of a first configuration and a second configuration, where in the first configuration the first surface of the fastener retention piece is adjacent the lower surface of the ring and in the second configuration the second surface is adjacent the lower surface of the ring.

19. The utility box of claim 12, wherein the second retaining recess is formed within the first retaining recess for retaining the second fastener when the first fastener is not within the first retaining recess.

* * * * *